(12) United States Patent
Kobayashi

(10) Patent No.: US 8,183,833 B2
(45) Date of Patent: May 22, 2012

(54) VOLTAGE BALANCER DEVICE FOR BATTERY PACK

(75) Inventor: Tetsuya Kobayashi, Anjo (JP)

(73) Assignee: Denso Corporation, Kariya (JP)

( * ) Notice: Subject to any disclaimer, the term of this patent is extended or adjusted under 35 U.S.C. 154(b) by 838 days.

(21) Appl. No.: 11/702,111

(22) Filed: Feb. 5, 2007

(65) Prior Publication Data

US 2007/0188138 A1    Aug. 16, 2007

(30) Foreign Application Priority Data

Feb. 16, 2006  (JP) .................................. 2006-038851
Oct. 19, 2006  (JP) .................................. 2006-285231

(51) Int. Cl.
*H02J 7/00* (2006.01)

(52) U.S. Cl. ........ 320/118; 320/117; 320/119; 320/121; 320/122; 324/427

(58) Field of Classification Search .......... 320/117–119, 320/121–122; 324/427
See application file for complete search history.

(56) References Cited

U.S. PATENT DOCUMENTS

| | | | |
|---|---|---|---|
| 5,387,857 A | | 2/1995 | Honda et al. |
| 5,557,189 A | * | 9/1996 | Suzuki et al. .................. 320/119 |
| 5,646,509 A | * | 7/1997 | Berglund et al. ............. 713/321 |
| 5,672,951 A | * | 9/1997 | Shiota ........................... 320/132 |
| 5,825,155 A | * | 10/1998 | Ito et al. ......................... 320/118 |
| 5,998,967 A | * | 12/1999 | Umeki et al. .................. 320/122 |
| 6,020,718 A | * | 2/2000 | Ozawa et al. .................. 320/116 |
| 6,081,095 A | * | 6/2000 | Tamura et al. ................. 320/118 |
| 7,999,554 B2 | * | 8/2011 | Bucur et al. ................... 324/434 |
| 2005/0127873 A1 | * | 6/2005 | Yamamoto et al. ........... 320/116 |

FOREIGN PATENT DOCUMENTS

| | | |
|---|---|---|
| JP | 05-064377 | 3/1993 |
| JP | 08/019188 | 1/1996 |
| JP | 11-262188 | 9/1999 |
| JP | 2000-083327 | 3/2000 |
| JP | 2003-134675 | 5/2003 |
| JP | 2003-284253 | 10/2003 |
| JP | 2004-248348 | 9/2004 |
| JP | 2005-056654 | 3/2005 |

OTHER PUBLICATIONS

Office Action (2 pgs.) dated Dec. 7, 2010 issued in corresponding Japanese Application No. 2006-285231 with an at least partial English-language translation thereof (3 pgs.).

* cited by examiner

*Primary Examiner* — Samuel Berhanu
(74) *Attorney, Agent, or Firm* — Nixon & Vanderhye P.C.

(57) ABSTRACT

A voltage balancer device has a plurality of discharge paths. Each pair of the discharge paths correspond to each secondary battery unit. Each of a pair of the discharge paths has a resistance of a different value. Discharging the voltage of each secondary battery unit is at first performed through the discharge path of a smaller resistance value. The voltage balancer device switches the currently used discharge path to another discharge path having a large resistance value at the time the voltage of the secondary battery unit nearly equal a desired voltage.

23 Claims, 12 Drawing Sheets

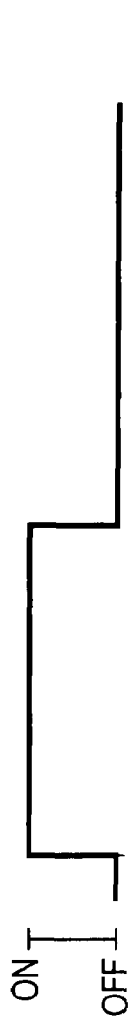
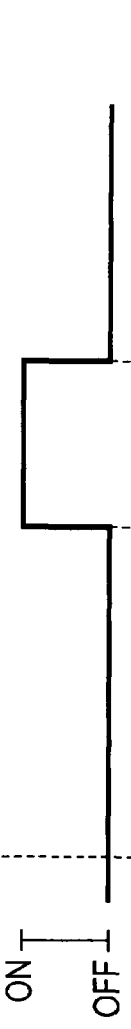
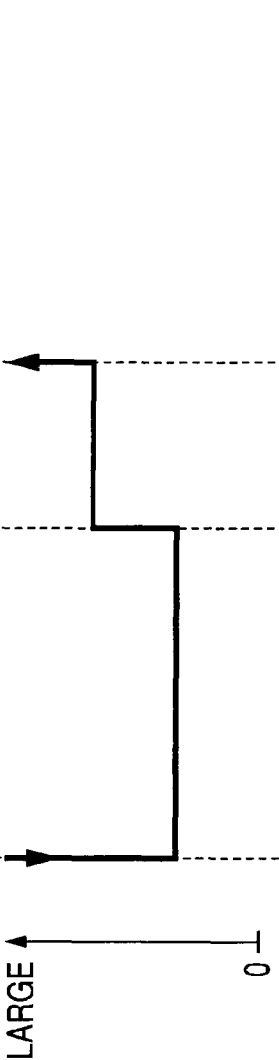
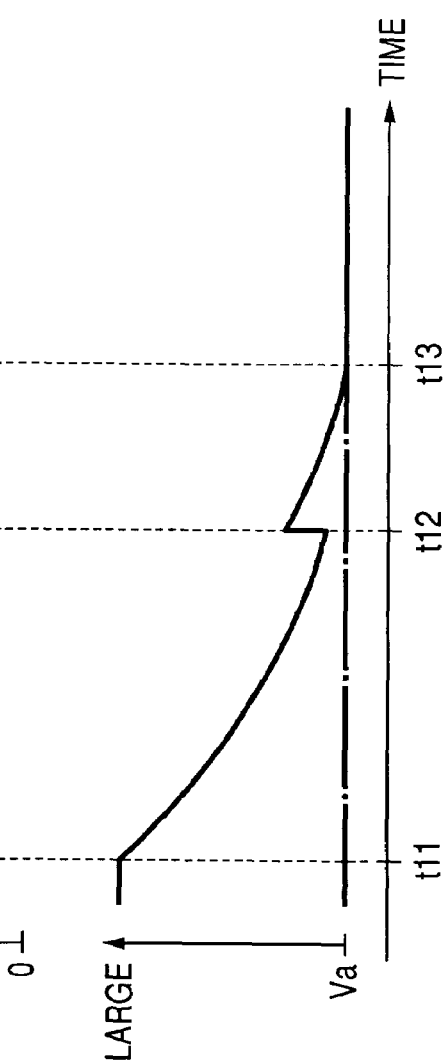
FIG. 4A SWITCHING ELEMENT 22 OF SMALL RESISTANCE VALUE
FIG. 4B SWITCHING ELEMENT 32 OF LARGE RESISTANCE VALUE
FIG. 4C RESISTANCE VALUE
FIG. 4D VOLTAGE

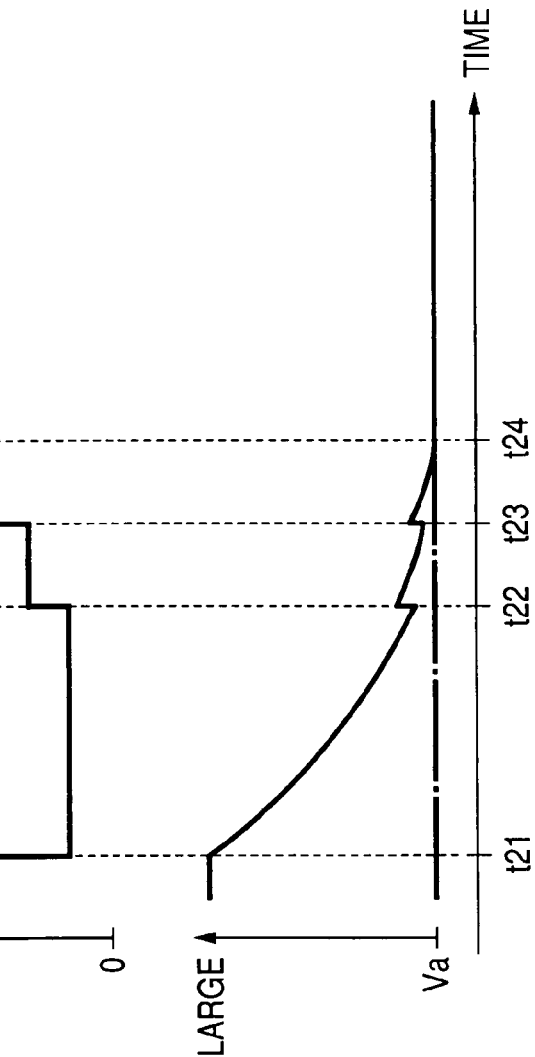
FIG. 5A  SWITCHING ELEMENT 22 OF SMALL RESISTANCE VALUE
FIG. 5B  SWITCHING ELEMENT 32 OF LARGE RESISTANCE VALUE
FIG. 5C  RESISTANCE VALUE
FIG. 5D  VOLTAGE

FIG. 9A  BASE CURRENT

FIG. 9B  DISCHARGE CURRENT

FIG. 9C  VOLTAGE

VOLTAGE BALANCER DEVICE FOR BATTERY PACK

CROSS-REFERENCE TO RELATED APPLICATIONS

This application is related to and claims priority from Japanese Patent Applications No. 2006-38851 filed on Feb. 16, 2006 and No. 2006-285231 filed on Oct. 19, 2006, the contents of which are hereby incorporated by reference.

BACKGROUND OF THE INVENTION

1. Field of the Invention

The present invention relates to a voltage balancer device for a battery pack composed of plural rechargeable secondary battery units connected in series or for a set of some secondary battery units adjacently connected, and the voltage balancer device is capable of adjusting the voltage of a secondary battery unit by discharging the voltage of the secondary battery unit.

2. Description of the Related Art

For example, a battery pack composed of a plurality of rechargeable secondary battery units (hereinafter, referred to as secondary battery units) connected in series is mounted on various types of vehicles such as a hybrid electric vehicle (HEV). In particular, such a HEV has a possibility of varying a voltage of each secondary battery mounted thereon. The voltage variation of each secondary battery unit in the HEV is caused by residual electric capacity of each secondary battery unit. The variation of the residual electric capacity is caused by various conditions such as the temperature variation and individual difference of each secondary battery unit. In order to eliminate the voltage variation between the secondary battery units, there is a conventional manner of charging all of the secondary battery units forming a battery pack by slightly over-discharging the battery pack composed of nickel-hydrogen battery.

On the contrary, a lithium battery as a secondary battery has a characteristic of promoting its deterioration by performing over-charging. If the over-charging is performed for such a lithium battery, the reliability thereof is drastically decreased.

Japanese patent laid open publication number JP2005-56654 has disclosed a voltage balancer device capable of adjusting the voltage of each secondary battery unit by detecting the voltage of each secondary battery unit and then by discharging a higher voltage of the secondary battery unit through a discharge path placed per secondary battery unit, where the discharge path is connected to the secondary battery unit in parallel. However, when an electric contact resistance of a connector that connects each secondary battery unit with each discharge path in the conventional voltage balancer device described above, the voltage of the secondary battery unit is determined by the sum of the voltage drop of the discharge path and the voltage drop of the connector. Accordingly, even if the voltage of the discharge path is decreased to a specified voltage level, the voltage value of the secondary battery unit involves an error equal to the voltage drop of the connector to the specified voltage value. It is necessary to increase the resistance value of the discharge path in order to reduce the amount of the error. However, this solution introduces that the current flowing through the discharge path becomes small and it takes a long period of time for discharging the secondary battery unit.

In general, not only a battery pack composed of a plurality of lithium battery units described above, but also a secondary battery capable of adjusting the voltage of each secondary battery unit by discharging a voltage of each secondary battery unit to a specified voltage have a common problem in which controlling a voltage of each secondary battery unit with high accuracy is contrary to the adjusting period of time necessary for adjusting the voltage of the secondary battery unit.

SUMMARY OF THE INVENTION

It is an object of the present invention to provide a voltage balancer device for a battery pack composed of a plurality of rechargeable secondary battery units capable of adjusting a voltage of each secondary battery unit to a desired voltage in a short time by discharging a voltage of each secondary battery unit to a specified voltage.

To achieve the above purposes, the present invention provides a voltage balancer device, for a battery pack, configured to discharge a voltage of the secondary battery unit to a desired voltage for voltage adjustment between the secondary battery units. The battery pack is composed of a plurality of rechargeable secondary battery units connected in series. Hereinafter, each rechargeable secondary battery unit is referred to as a secondary battery unit for short. The voltage balancer device has a discharge path per secondary battery unit and a control means. The discharge path is connected in parallel to the secondary battery unit and the discharge path is placed per secondary battery unit. The control means is configured to limit a current flowing through the discharge path so that an actual current flowing through the discharge path at the desired voltage becomes lower than a current at the desired voltage determined on a straight line between an origin regarding a voltage of both ends of the discharge path and a current flowing through the discharge path and an actual value of the current at a beginning of the discharging of the secondary battery unit.

When compared with a conventional configuration of a voltage balancer device in which each discharge path is equipped with only a resistance, the amount of an actual current flowing through the discharge path is determined along a straight line. This straight line connects the origin in a relationship between voltages at both ends of the discharge path to a current flowing through the discharge path at a discharge initiating time. In this case, it is necessary to reduce the resistance value of the discharge path in order to reduce the total period of time for performing the discharging. However, the conventional configuration of the voltage balancer device involves a drawback in which the occurrence of increasing the resistance value of a connection node between the discharge path and each secondary battery unit decreases the voltage adjusting accuracy at the time the voltage of each secondary battery unit is reduced to a desired voltage based on the magnitude of the voltage drop of the discharge path.

On the contrary, in the configuration of the voltage balancer device according to the present invention, the voltage balancer device so controls that the actual current becomes lower than the current value determined by the above straight line at the time the voltage of the discharge path is nearly equal to the desired voltage.

In the voltage balancer device according to another aspect of the present invention, the control means has a variable resistance means configured to increase a resistance value of the discharge path through which the discharge current flows according to decreasing of the voltage of each secondary battery unit. In this configuration, it is possible to preferably limit the current value which becomes near the desired voltage of each secondary battery unit by increasing the resistance value of the discharge path according to decreasing the voltage of each secondary battery unit.

In the voltage balancer device according to another aspect of the present invention, the discharge path is composed of plural paths. Each path is composed of a resistance and a switching element which is capable of switching an electrical on-off connection of the discharge path. The variable resistance means selects the discharge path to be used for discharging according to the state of the switching element under the control of the control means. In this configuration, it is possible to form each discharge path with the switching element and the resistance, and thereby possible to realize the variable resistance means by controlling the operation of the switching element.

In the voltage balancer device according to another aspect of the present invention, the discharge path has a switching element and the control means has an operational amplifier. One input terminal of the operational amplifier is electrically connected to a connection node between the resistance and the switching element. A voltage of more than 0V is applied to the other input terminal of the operational amplifier. In the configuration, the amount of the current flowing through the discharge path becomes zero when the voltage at both ends of the discharge path becomes equal to the voltage applied to the input terminal of the operational amplifier. When compared with the characteristic of the straight line which connects an origin regarding the relationship (namely, along the straight line) between the voltage at both ends of the discharge path and the current flowing through the discharge path, the voltage of both ends of the discharge path, the straight line obtained by the voltage applied to both ends of the discharge path and the actual current flowing through the discharge path provides a smaller current value at a same voltage. It is thereby possible that an actual current at the desired voltage becomes smaller than the current value at the desired voltage determined by the straight line which connects the origin of the voltage at both ends of the discharge path and the current flowing through the discharge path.

According to another aspect of the present invention, the voltage balancer device further has a switch means configured to switch the electrical connection between the output terminal of the operational amplifier and an activation control terminal of the switching element. The control means so controls in order to adjust the voltage of the plural secondary battery units that the switching means electrically connects the output terminal of the operational amplifier to the activation control terminal of the switching element. In this configuration, it is possible to avoid the operation of discharging the secondary battery units through the discharge path by the switching means when not requested.

In the voltage balancer device according to another aspect of the present invention, the control means applies a voltage equal to an ordinary-use voltage of the battery pack to the other input terminal of the operational amplifier. In this configuration, it is possible to set the amount of the current flowing through the discharge path to zero when the voltage of both ends of the discharge path becomes nearly equal to the desired voltage.

In the voltage balancer device according to another aspect of the present invention, each discharge path connects in parallel to each secondary battery unit, and each discharge path has a switching element configured to switch electrical connection/non-connection of each discharge path and a constant current discharging means. The control means selects the path in the discharge path by activating the switching element corresponding to the discharge path to be used for discharging. In this configuration, it is possible to change the amount of an actual current flowing through the discharge path by switching the currently-used discharge path with another discharge path.

According to another aspect of the present invention, the voltage balancer device for a battery pack composed of a plurality of secondary battery units connected in series is configured to discharge to a desired voltage a voltage of each secondary battery unit or a voltage of a group composed of some secondary battery units in order to adjust the voltage of each secondary battery unit. Each discharge path is connected in parallel to and placed at each secondary battery unit. Each discharge path has a switching element capable of switching an electrical on-off connection of the discharge path. In this configuration, because the discharge path is composed of a plurality of discharge paths, it is possible to adjust the amount of the discharging current flowing through the discharge path by switching the discharge path. This configuration enables a large amount of the discharging current to flow at the beginning period in the discharging and a small amount of the discharging current to flow in a latter period in the discharging. This can set the voltage of the secondary battery unit to a desired voltage with high accuracy at high speed.

According to another aspect of the present invention, the voltage balancer device for a battery pack composed of a plurality of secondary battery units connected in series is configured to discharge to a desired voltage a voltage of each secondary battery unit or a voltage of a group composed of some secondary battery units in order to adjust the voltage of each secondary battery unit. The voltage balancer device has a discharge path and an operational amplifier. The discharge path is equipped with a switching element capable of switching an electrical on-off connection of the discharge path. Each discharge path is connected in parallel to and placed per secondary battery unit. An output terminal of the operational amplifier is connected to an activation control terminal of the switching element. In the voltage balancer device, one input terminal of the operational amplifier is connected to a connection node between the resistance and the switching element, and a voltage of more than 0V is applied to the other input terminal of the operational amplifier. In this configuration, the amount of the current flowing through the discharge path becomes zero when the voltage at both ends of the discharge path is equal to the voltage applied to the other input terminal of the operational amplifier. It is possible to easily control the amount of the current flowing through the discharge path when the voltage at both ends of the discharge path becomes the desired voltage. This can set the voltage of the secondary battery unit to a desired voltage with high accuracy at high speed.

In the voltage balancer device according to another aspect of the present invention, the discharge path further has a constant current discharge means. In this configuration, it is possible to change the actual current flowing through the discharge path by switching the discharge path for use in the discharging. This configuration enables a large amount of the discharging current to flow at the beginning period of the discharging, and a small amount of the discharging current to flow in a latter period of the discharging. This can set the voltage of the secondary battery unit to a desired voltage with high accuracy at high speed.

In the voltage balancer device according to another aspect of the present invention, the discharge path further has a resistance. In this configuration, it is also possible to change the actual current flowing through the discharge path by switching the discharge path for use in the discharging. This configuration enables to flow a large amount of the discharging current at the beginning period of the discharging, and to flow a small amount of the discharging current in a latter period of the discharging. This can set the voltage of the secondary battery unit to a desired voltage with high accuracy at high speed.

According to another aspect of the present invention, a voltage balancer device for a battery pack composed of a plurality of secondary battery units connected in series is configured to discharge to a desired voltage a voltage of each secondary battery unit or a voltage of a group composed of some secondary battery units in order to adjust the voltage of each secondary battery unit. In particular, the voltage balancer device has discharge paths and a control means. Each of the discharge paths is connected in parallel to and placed at each secondary battery unit. The control means is configured to limit an actual current flowing through the discharge path when the voltage of the corresponding secondary battery unit becomes equal to a desired voltage by changing a change rate of the current flowing through the discharge path corresponding to the change of the voltage of the secondary battery unit. This configuration having the control means enables a large amount of the discharging current to flow at the beginning period of the discharging, and a small amount of the discharging current to flow in a latter period of the discharging. This can set the voltage of the secondary battery unit to a desired voltage with high accuracy at high speed.

In the voltage balancer device according to another aspect of the present invention, the control means has variable resistance means capable of increasing a resistance value according to decreasing the voltage of the secondary battery unit. This configuration enables to preferably limit the amount of the current flowing through the discharge path when the voltage of the secondary battery unit reaches nearly equal to the desired voltage by increasing the resistance value of the discharge path according to the voltage drop of the secondary battery unit.

In the voltage balancer device according to another aspect of the present invention, the discharge path is composed of a plurality of the discharge paths connected in parallel to the secondary battery units, each of the plural discharge paths has a resistance and a switching element capable of switching an electrical on-off connection of the discharge path, and the variable resistance means selects the discharge path to be used for discharging by controlling the switching element. In this configuration, the discharge path is composed of a plurality of the discharge paths and each discharge path is equipped with the switching element and the resistance. It is thereby possible to realize the variable resistance means by controlling the operation of the switching element.

In the voltage balancer device according to another aspect of the present invention, the discharge path is composed of a plurality of the discharge paths connected in parallel to the secondary battery units, each of the plural discharge paths has a constant current discharge means and a switching element capable of switching an electrical on-off connection of the discharge path, and the control means selects the discharge path to be used for discharging by activating the switching element. This configuration enables to change the amount of the actual discharging current by switching the discharge path to be used for discharging. It is thereby possible to use the control means as the variable setting means capable of switching the discharge path to be used for discharging.

The voltage balancer device according to another aspect of the present invention further has an average value detecting means configured to detect an average value of the total voltages of the secondary battery units. In the voltage balancer device, the control means so controls that the secondary battery unit whose voltage is more than the average value is discharged through the discharge path corresponding to the secondary battery unit. It is thereby possible to uniform all of the voltages of the secondary battery units by discharging the voltage of the discharge path whose voltage is over the average value of the voltage.

BRIEF DESCRIPTION OF THE DRAWINGS

A preferred, non-limiting embodiment of the present invention will be described by way of example with reference to the accompanying drawings, in which:

FIGS. 4A to 4D are views showing timing charts of the discharging processes under the control of the voltage balancer device of the first embodiment shown in FIG. 1;

FIGS. 5A to 5D are timing charts showing the discharging process of a voltage balancer device according to a second embodiment of the present invention;

DETAILED DESCRIPTION OF THE PREFERRED EMBODIMENTS

Figure 1:
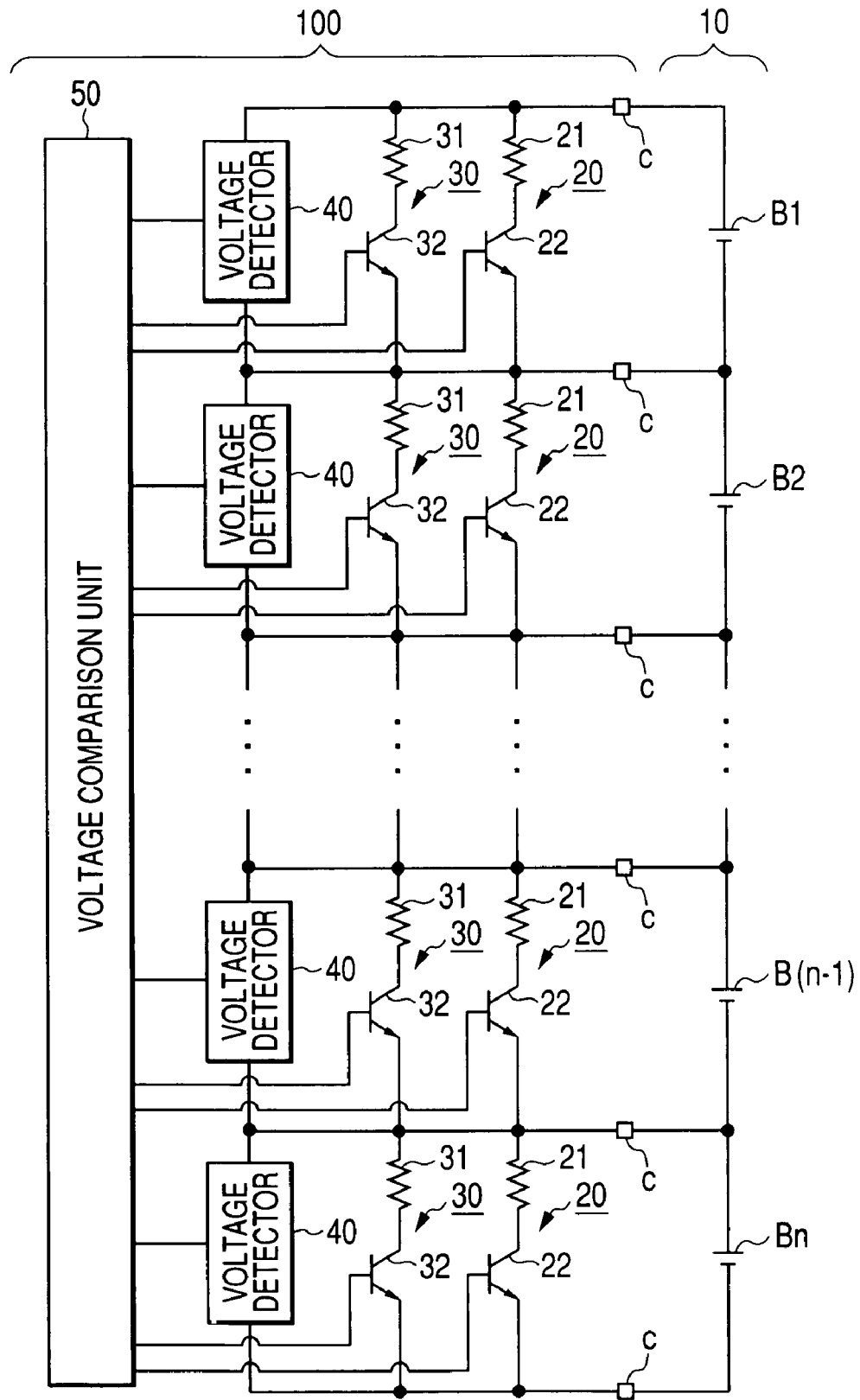
FIG. 1 is a view showing an entire configuration of a voltage balancer device for a battery pack according to a first embodiment of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of a voltage balancer device 100 for a battery pack 10 according to the first embodiment of the present invention with reference to FIG. 1 to FIGS. 4A, 4B, 4C, and 4D. The battery pack is composed of a plurality of rechargeable secondary battery units B1 to Bn connected in series. The voltage balancer device of the present invention is applicable to a hybrid electric vehicle (HEV).

Figure 10:
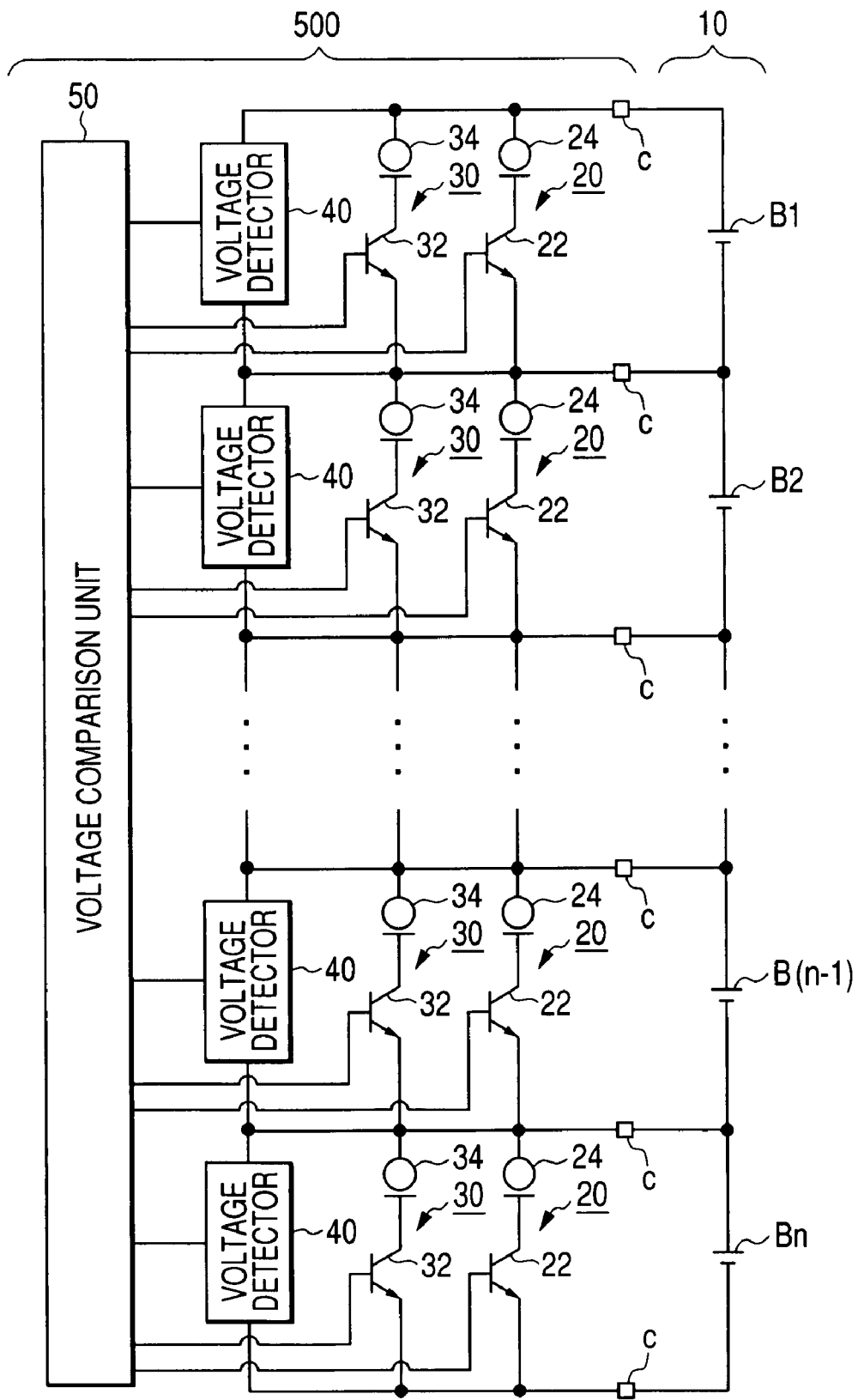
FIG. 10 is a view showing an entire configuration of a voltage balancer device for a battery pack according to a fifth embodiment of the present invention.

FIG. 1 is a view showing an entire configuration of the voltage balancer device 100 for the battery pack 10 according to the first embodiment of the present invention. As shown in FIG. 10, the battery pack 10 is composed of a plurality of rechargeable lithium secondary battery units B1 to Bn that are electrically connected in series, where "n" is a natural number of two or more. Hereinafter, the rechargeable lithium secondary battery units B1 to Bn are referred to as secondary battery units b1 to Bn for short.

The battery pack 10 acts as an electric power receptor capable of recovering the electric power converted by and provided from a vehicle alternator (not shown) mounted on a HEV when applying breaks. Furthermore, the battery pack 10 acts as an electric power supplier capable of supplying the accumulated electric power to a vehicular battery of 12 Volts for example, through a DC-DC converter. Still furthermore, the battery pack 10 acts as an electric power source capable of assisting an engine mounted on the HEV when accelerating the driving speed of the HEV.

In the configuration of the first embodiment, discharge paths 20 and 30 are formed. The secondary battery units B1 to Bn are electrically connected in parallel to a pair of the discharge path 20 and the discharge path 30 through a corresponding connector C. The discharge path 20 is equipped with a series circuit consisting of a resistance 21 and a switching element 22. Similarly, the discharging path 30 is equipped with a series circuit consisting of a resistance 31 and a switching element 32. Those series circuits are electrically connected to the secondary battery units B1 to Bn through the connectors C.

Voltage detectors 40 are electrically connected in parallel to the discharge paths 20 and 30. Each voltage detector 40 detects a voltage between both end terminals of each secondary battery B1 to Bn. The voltage detector 40 outputs a detection result to a voltage comparison unit 50 (as control means). When receiving the detection result from each voltage detector 40, the voltage comparison unit 50 controls the operation of the switching elements 22 and 32 based on the detection result received.

For more detailed explanation, the voltage comparison unit 50 as the control means calculates an average value of the voltages of the secondary battery units B1 to Bn transferred form the voltage detectors 40, and provides an instruction to the secondary battery units having a voltage higher than the calculated average value in order to discharge those secondary battery units B1 to Bn. It is thereby possible for all of the secondary battery units B1 to Bn to have a same voltage level.

Figure 2:
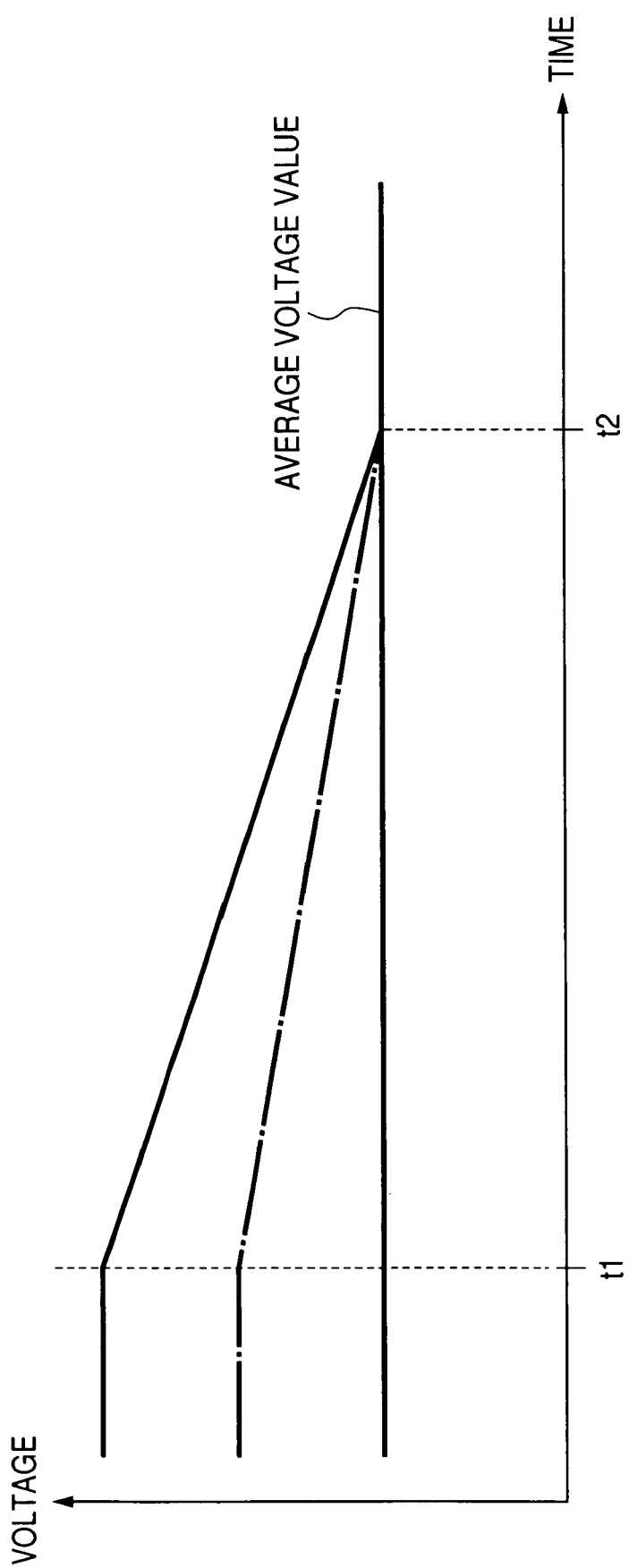
FIG. 2 is a timing chart showing a discharging process of discharging a voltage of a secondary battery unit under the control of the voltage balancer device according to the first embodiment shown in FIG. 1.

FIG. 2 is a timing chart showing a discharging process performed by the voltage balancer device 100 according to the first embodiment shown in FIG. 1. The case shown in FIG. 2 uses a simple model in which the number of the secondary battery units is only two for the convenience of explanation.

In FIG. 2, the solid line designates a voltage of each secondary battery, and the alternate long and short dash line denotes an average value of the voltage of the two secondary battery units. As shown in FIG. 2, when the discharging is initiated at time t1, the voltage of the secondary battery unit larger than the average voltage value is decreased to the average voltage value. According to the voltage decreasing, the average voltage value is also decreased. When the voltage of the secondary battery unit becomes equal to the average voltage value at time t2, the discharging process is completed.

When the resistance of the part other than the discharge paths 20 and 30 in a closed loop circuit consisting of the secondary battery B1 to Bn and the discharge paths 20 and 30 is increased, for example, when a contact resistance of the connector C is increased, the magnitude of the voltage drop of that part cannot be disregarded during the discharging process. That is, when the secondary battery units B1 to Bn are discharged through the discharge path 20 when the contact resistance of the connector C is increased, the sum of the voltage drop of the resistance 21 and the voltage drop of the contact resistance of the connector C becomes equal to the voltage of each of the secondary battery units B1 to Bn.

On the contrary, the voltage detector 40 detects in fact the voltage between both ends of the discharge path 20 as the voltage of the secondary battery units B1 to Bn. This means that the voltage of the secondary battery units B1 to Bn detected by the voltage detector 40 includes the error component obtained by the voltage drop of the contact resistance of the connector C. In order to eliminate or reduce the error component as large as possible, it is preferred to increase the resistance value of both of the discharge paths 20 and 30 because the magnitude of the voltage drop of the contact resistance of the connector C becomes a negligibly small value when compared with the magnitude of the voltage drop of the discharge paths 20 and 30. However, this case accompanies or requires a long period of time for discharging the voltage of the secondary battery units B1 to Bn through the discharge paths 20 and 30.

Figure 3A:
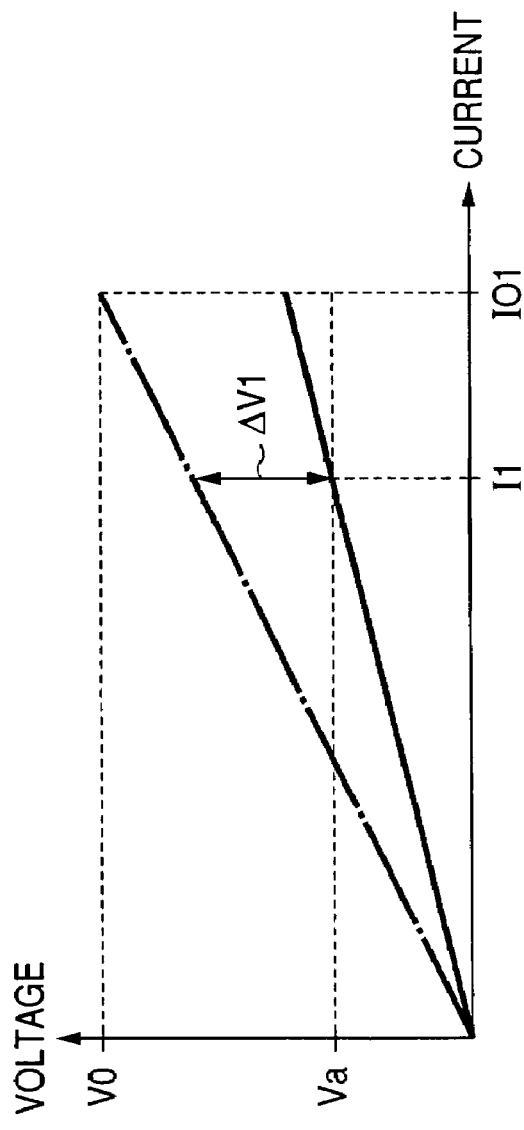
FIGS. 3A and 3B are views showing a relationship between a discharge current and a voltage in different voltage adjustment accuracy performed by the voltage balancer device of the first embodiment shown in FIG. 1.
Figure 3B:
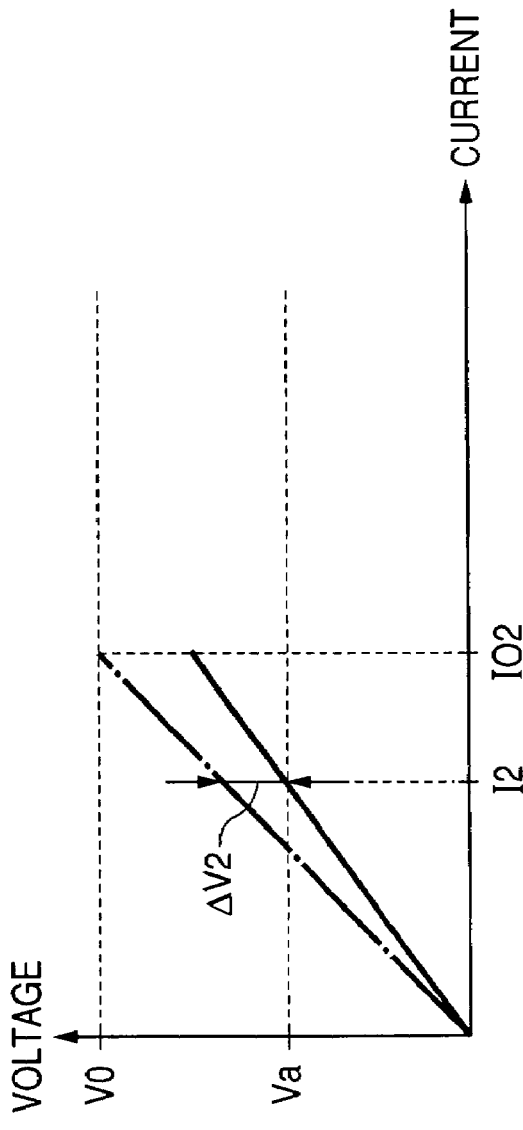

FIG. 3A shows a relationship between a voltage of each of the discharge paths 20 and 30 and a discharge current flowing through each of the discharge paths 20 and 30 with a small resistance value. FIG. 3B shows a relationship between a voltage of each of the discharge paths 20 and 30 and a discharge current flowing through each of the discharge paths 20 and 30 with a large resistance value. In FIGS. 3A and 3B, the alternate long and short dash line designates the voltage at both end terminals of the secondary battery units B1 to Bn, and the solid line denotes the voltage at the both ends of the discharge paths 20 and 30. Reference character V0 indicates the voltage of the secondary battery units B1 to Bn at the beginning time of the discharging, and Va denotes a desired voltage of the secondary battery units B1 to Bn.

As shown in FIGS. 3A and 3B, the small resistance value of the discharge paths 20 and 30 enables to increase the current flowing through the discharge paths 20 and 30. However, the voltage of the secondary battery units B1 to Bn takes the sum of the desired voltage Va and an error component $\Delta V1$ (see FIG. 3A) when the voltage at both end terminals of the discharge paths 20 and 30 reaches a desired voltage value Va.

On the contrary, in case of a large resistance value of the discharge paths 20 and 30, the voltage of the secondary battery units B1 to Bn takes the sum of the desired voltage Va and an error component $\Delta V2$ (see FIG. 3B) when the voltage at both end terminals of the discharge paths 20 and 30 reaches the desired voltage value Va. The error component $\Delta V2$ shown in FIG. 3B is smaller than the error component $\Delta V1$ shown in FIG. 3A. If the resistance of the discharge paths 20 and 30 becomes high, it takes a long time to perform the discharge because the amount of current flow becomes small, namely, the maximum current value I02 of the case shown in FIG. 3B is larger than the maximum current value I01 of the case shown in FIG. 3A (I02>I01).

In order to solve the above drawback, the voltage balancer device 100 according to the first embodiment switches the discharge paths. For more detailed explanation, the resistance value 31 mounted on the discharge path 30 is larger than the resistance value 21 mounted on the discharge path 20. The voltage balancer device 100 of the first embodiment uses the discharge path 20 in the beginning discharging period, then switches the currently-used discharge path 20 with the other discharge path 30, and uses the discharge path 30 in the latter discharging period. FIG. 3A shows the discharging process only through the discharge path 20, and FIG. 3B shows the discharging process only through the discharge path 30. The current has the current value I01 in the beginning discharging period (see FIG. 3A), and the current has the current value I02 in the latter discharging period (FIG. 3B). It is thereby possible for the small current value I2 to flow when the voltage detected by the voltage detector 40 becomes the desired voltage value Va, wherein the current value I2 is smaller than the current value I1 using the discharge path 20.

FIGS. 4A to 4D are views, each showing a timing chart of the discharging process of the voltage balancer device 100 of the first embodiment shown in FIG. 1. FIG. 4A shows the operation of the switching element 22 in the discharge path 20. FIG. 4B shows the operation of the switching element 32 in the discharge path 30. FIG. 4C shows the resistance variation of the discharge path through which the voltage is currently discharged. FIG. 4D shows the voltage variation detected by the voltage detector 40.

As shown in FIGS. 4A to 4D, when the switching element 22 is turned on at time t11, the resistance of the discharge path 20 becomes the resistance value of the resistance 21. The discharging is thereby initiated. The voltage detected by the voltage detector 40 is thereby decreased. At time t12, the voltage comparison unit 50 as the control means so controls that the switching element 22 is turned off and the switching element 32 is turned on instead. The resistance value of the discharge path 30 through which the discharging is performed is thereby increased. Because this increases a ratio of the voltage drop of the discharge path 30 to the voltage drop of the entire closed loop circuit including the secondary battery units B1 to Bn, the voltage is temporarily increased at time t12. After this, the voltage detected by the voltage detector 40 is decreased by performing the discharging through the discharge path 30. Then, when the voltage becomes the desired voltage value at time t13, the voltage comparison unit 50 so controls that the switching element 32 is turned off. The discharging process is thereby completed.

According to the voltage balancer device 100 of the first embodiment described above, the voltage comparison device 50 as the control means so controls that the discharge path 20 is switched to the discharge path 30 when the voltage detected by the voltage detector 40 is nearly equal to the desired voltage Va.

In a concrete example, the desired voltage Va of a lithium battery takes a range of 3.0V to 4.0V and preferably takes approximately 3.6 V in normal use. Further, the discharge path 20 is switched to the discharge path 30 when the voltage detected by the voltage detector 40 is within a range of 3.6V to 3.7V, for example.

It is thereby possible to limit the amount of discharge current when the voltage detected by the voltage detector 40 is nearly equal to the desired voltage Va, and also possible for the voltage detector 40 to accurately detect the voltage of the secondary battery units B1 to Bn. The voltage balancer device 100 of the first embodiment enables accurate control of the secondary battery units B1 to Bn to a desired voltage.

Accordingly, the voltage balancer device 100 of the first embodiment has the effects (1), (2), and (3).

(1) The resistance value of the discharge path is increased according to the magnitude of the voltage drop of the secondary battery units B1 to Bn. This enables to efficiently limit the current value when the voltage of the secondary battery units B1 to Bn is nearly equal the desired voltage.

(2) The discharge paths 20 and 30 are equipped with the resistances 21 and 31 of different resistance values, respectively. The discharge path is switched with another discharge path by operating the switching elements 22 and 32 in the discharge paths 20 and 30, respectively. It is thereby possible to change the resistance value of the discharge path through which the voltage of the secondary battery units B1 to Bn is currently discharged.

(3) Each voltage of the secondary battery units B1 to Bn is detected, and the average value of the detected voltages is calculated, and the voltages of the secondary battery units which are higher than the calculated average value are discharged in order to uniform the voltages of all of the secondary battery units B1 to Bn.

Second Embodiment

Hereinafter, a description will be given of the voltage balancer device according to the second embodiment with reference to FIGS. 5A to 5D. The voltage balancer device according to the second embodiment is equal in configuration to the voltage balancer device 100 of the first embodiment shown in FIG. 1, the discharging operation of the voltage balancer device 100 according to the second embodiment is different from that of the first embodiment. That is, in the voltage balancer device of the second embodiment performs three steps for discharging. The primary discharging step is performed using both of the discharge paths 20 and 30 connected in parallel. The secondary discharging step is performed only using the discharge path 20, and the final discharging step is performed only using the discharge path 30.

FIGS. 5A to 5D are views showing the timing charts of the discharging processes under the control of the voltage balancer device 100 according to the second embodiment of the present invention. Those timing charts shown in FIGS. 5A to 5D correspond to the timing charts shown in FIG. 4A to 4D, respectively.

As shown in FIG. 5A to 5D, the discharge is initiated when both of the switching elements 22 and 32 are turned on at timing t21. The voltage comparison unit 50 as the control means so controls that the switching element 32 is turned off and the switching element 32 is not changed, namely, still turned on at timing t22, where the voltage detected by the voltage detector 40 is nearly equal the desired voltage Va.

Because the resistance value of the discharge path for use in the discharging is thereby increased, a ratio of the voltage drop of the discharge path to the voltage drop of the entire closed loop circuit including the secondary battery units B1 to Bn is increased. The voltage detected by the voltage detector 40 is thereby increased at time t22. After this, the voltage drops again, and at timing t23 where the voltage is further nearly equal the desired voltage Va when compared with the voltage at time t22, the voltage comparison unit 50 so controls that the switching element 22 is turned off and the switching element 32 is turned on instead. Because this switching increases the resistance value of the discharge path for use in the discharging, the ratio of the voltage drop of the discharge path to the total voltage drop of the closed loop circuit including the secondary battery units B1 to Bn. At time t23, the voltage detected by the voltage detector 40 is thereby increased. When the voltage is decreased again to the desired voltage Va, the voltage comparison unit 50 so controls that the switching element 22 is turned off. The discharging is thereby completed.

As described above in detail, the voltage balancer device 100 according to the second embodiment further has the following effect (4) in addition to the effects (1) to (3) of the voltage balancer device of the first embodiment.

(4) It is possible to form the discharge path having a smaller resistance value by using both of the discharge paths 20 and 30 connected in parallel.

Third Embodiment

Hereinafter, a description will be given of the voltage balancer device 300 according to the third embodiment with reference to FIG. 6 and FIG. 7.

Figure 6:
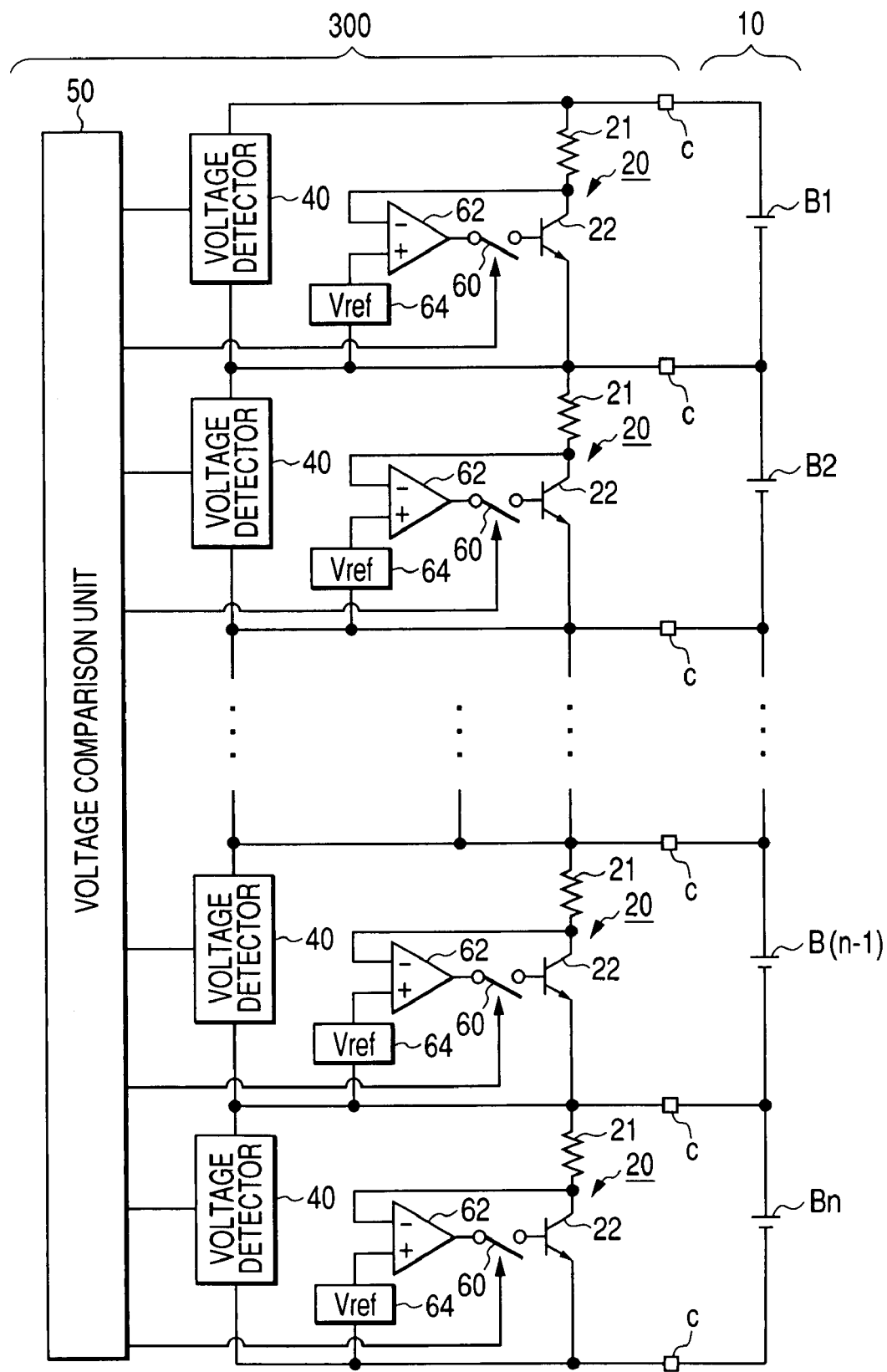
FIG. 6 is a view showing an entire configuration of a voltage balancer device for a battery pack according to a third embodiment of the present invention.

FIG. 6 is a view showing an entire configuration of the voltage balancer device 300 for the battery pack 10 according to the third embodiment. The battery pack 10 is composed of a plurality of rechargeable secondary battery units B1 to Bn. The voltage balancer device 300 of the third embodiment is basically equal to that of the first embodiment. The difference between the third embodiment and the first embodiment will be mainly described later. In the following explanation, the components of the voltage balancer device 300 of the third embodiment which are the same as those of the first embodiments are designated with the same numbers.

In the configuration of the voltage balancer device 300 shown in FIG. 6, each discharge path 20 corresponds to each of the secondary battery units B1 to Bn, and each discharge path 20 is connected in parallel to each secondary battery unit.

Through a switch 60, an output terminal of an operation amplifier 62 is electrically connected to an on-state control terminal of the switching element 22 or a base terminal of a bipolar transistor as the switching element.

An inverse input terminal, designated by reference character "−" in FIG. 6, of the operational amplifier 62 is electrically connected to the connection node between the resistance 21 and the switching element 22. A reference voltage Vref of a reference voltage power source is applied to a non-inverse input terminal, designated by reference character "+" in FIG. 6, of the operational amplifier 62. The voltage comparison unit 50 transfers the instruction to the switching element 60 which corresponds to the secondary battery whose voltage is more than the minimum voltage of the secondary battery units B1 to Bn. The secondary battery units having the voltage of more than the minimum voltage are thereby discharged.

Figure 7:
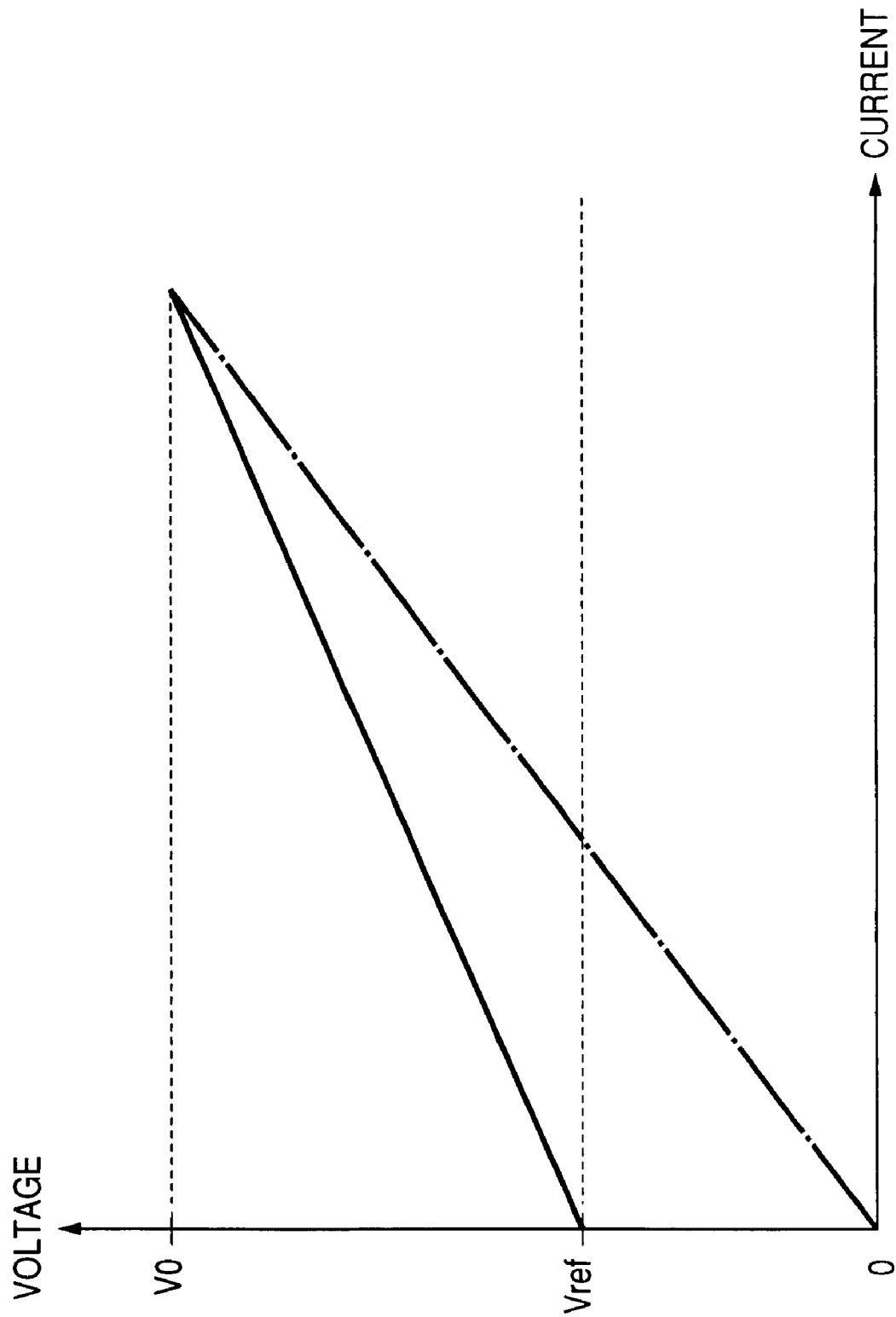
FIG. 7 is a view showing a relationship between a discharge current and a voltage in voltage adjustment accuracy under the control of the voltage balancer device of the third embodiment.

FIG. 7 is a view showing a relationship between a discharged current and a voltage detected by the voltage detector 40 when the switching element 60 is turned on. In FIG. 7, the solid line shows the change of the voltage detected by the voltage detector 40. The voltage drops from the voltage Vo to the reference voltage Vref designated by the solid line in FIG. 7. Because the current flow can be limited near the reference voltage Vref, it is possible to control the voltage of each of the secondary battery units B1 to Bn with high accuracy when the desired voltage is near the reference voltage Vref. In this case, the reference voltage Vref is a voltage (for example, 3.6 V) corresponding to the residual capacity of each of the secondary battery units B1 to Bn in an ordinary use range of the battery pack. It is thereby possible to have the current value of approximate zero which nearly equals the desired voltage.

On the contrary, in FIG. 7, the alternate long and short dash line indicates the change of the voltage when zero voltage is applied to the non-inverse input terminal of the operational amplifier 62. In this case, the current is changed, just like the case of the voltage balancer device 100 according to the first embodiment shown in FIG. 1 in which the discharge path 20 is made of the resistance 21 and a large amount of current flows when the voltage is equal to the reference voltage Vref.

Accordingly, the voltage balancer device 300 of the third embodiment having the above configuration has the following effects (5), (6), and (7).

(5) In the voltage balancer device 300 of the third embodiment, the output signal of the operational amplifier 62 is transferred to the on-state control terminal of the switching element 22 (namely, to the base terminal of the bipolar transistor 22) through the switch 60, and the inverse-input terminal (designated by reference character "−" in FIG. 6) of the operational amplifier 62 is connected to the connection node between the resistance 21 and the switching element 22, and the voltage of more than zero is applied to the non-inverse terminal (designated by reference character "+" in FIG. 6) of the operational amplifier 62. It is thereby possible to limit the amount of the actual current when the voltage is near or equal to the desired voltage, and thereby possible to control the voltage of each of the secondary battery units B1 to Bn with high accuracy.

(6) The voltage balancer device 300 according to the third embodiment has the switch 60 capable of switching the on/off electrical connection between the operational amplifier 62 and the switching element 22, and the switch 60 is turned only when the voltage control or adjusting between the secondary battery units B1 to Bn is requested. It is thereby possible to avoid the discharging through the discharge path during the unnecessary voltage adjustment.

(7) It is possible to perform the voltage control or adjustment between the secondary battery units B1 to Bn at much higher accuracy by applying the voltage for use in ordinary process to the non-inverse input terminal (designated by reference character "+" in FIG. 6) of the operational amplifier 62.

Fourth Embodiment

Hereinafter, a description will be given of the voltage balancer device 400 according to the fourth embodiment with reference to FIG. 8 and FIG. 9.

Figure 8:
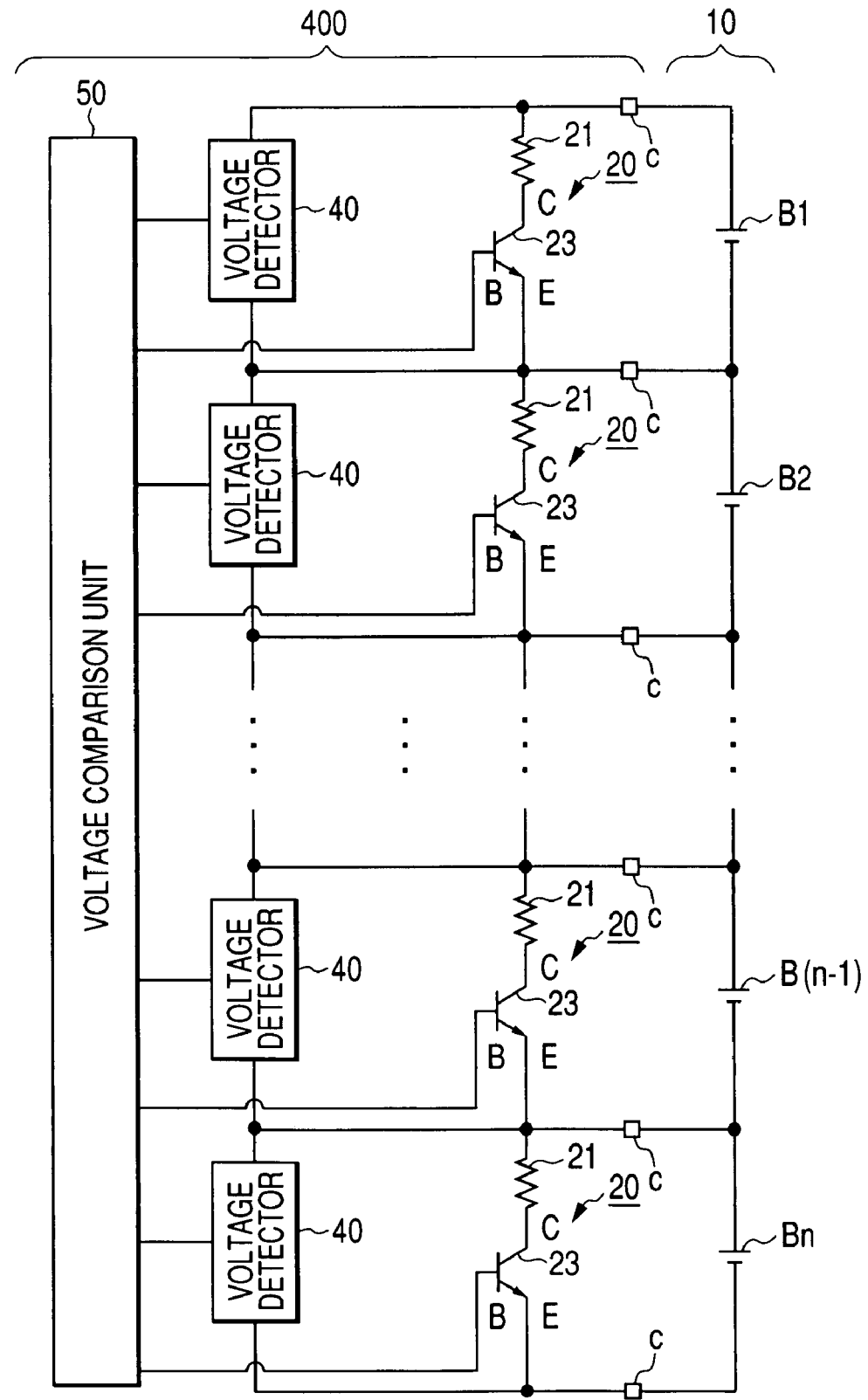
FIG. 8 is a view showing an entire configuration of a voltage balancer device for a battery pack according to a fourth embodiment of the present invention.
Figure 9:
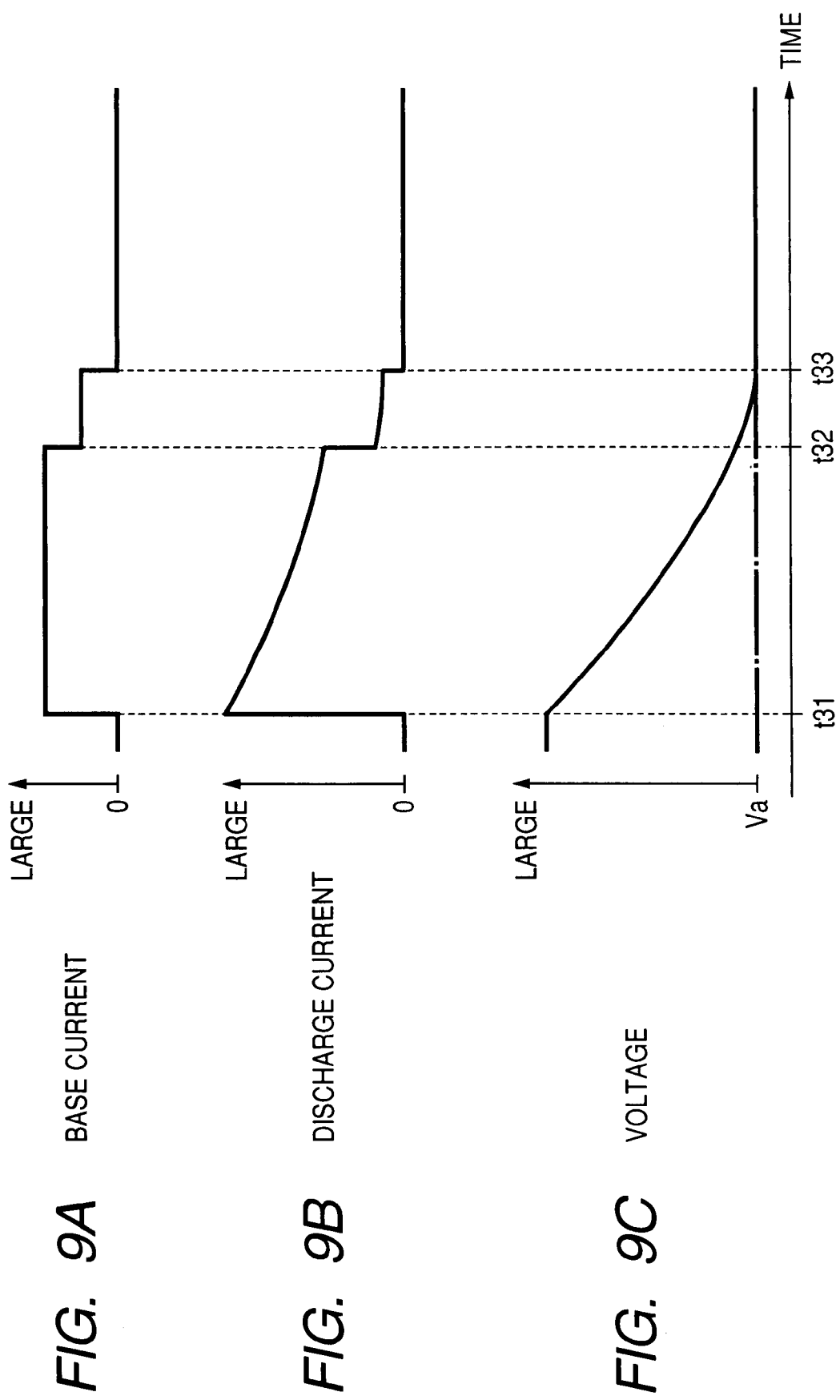
FIGS. 9A to 9C are views showing timing charts of the discharging process of the voltage balancer device of the fourth embodiment shown in FIG. 8.

FIG. 8 is a view showing an entire configuration of the voltage balancer device 400 for the battery pack according to the fourth embodiment. The battery pack is composed of a plurality of the rechargeable secondary battery units B1 to Bn. The voltage balancer device 400 of the fourth embodiment is basically equal to that of the first embodiment. The difference between the first embodiment and the fourth embodiment will be mainly described later. In the following explanation, the components of the voltage balancer device 400 of the fourth embodiment which are the same as those of the first embodiments are designated with the same numbers.

As shown in FIG. 8, the discharge path 20 is placed in parallel to each of the secondary battery units B1 to Bn. The discharge path 20 is composed of the resistance 21 and a bipolar transistor 23 connected in series. In the fourth embodiment, the current flowing through the on-state control terminal (a base terminal) of the bipolar transistor 23 is decreased in the latter period in the discharging, not in the beginning period therein in order to limit the amount of current flowing through the collector and emitter of the bipolar transistor 23. In other words, the current flowing through the collector and the emitter of the bipolar transistor 23 is limited by controlling so that the voltage detected by the voltage detector 40 becomes nearly equal the desired voltage Va.

FIGS. 9A to 9C are views showing timing charts of the discharging process under the control of the voltage comparison unit 50 as the control means in the voltage balancer device 400 of the fourth embodiment shown in FIG. 8. In particular, FIG. 9A shows the current flowing through the base terminal of the bipolar transistor 23, FIG. 9B shows the current flowing through the discharge path 20, and FIG. 9C shows the voltage detected by the voltage detector 40.

As shown in FIGS. 9A to 9C, the voltage comparison unit 50 activates the base terminal of the bipolar transistor 23 at timing t31, so that the collector and the emitter of the bipolar transistor 23 are electrically connected, namely, the current flows between the emitter terminal and collector terminal of the bipolar transistor 23. Thereby, the voltage detected by the voltage detector 40 gradually drops.

At timing t32 when the voltage detected by the voltage detector 40 becomes nearly equal the desired voltage Va, the voltage comparison unit 50 controls so that the amount of current flowing through the base terminal of the bipolar transistor 23 is decreased. Simultaneously, it is preferred that the voltage comparison unit 50 detects the voltage between the base terminal and the emitter terminal of the bipolar transistor 23 and controls the amount of the current flowing through the base terminal of the bipolar transistor 23 according to this detected voltage. It is thereby possible to limit the current flowing between the collector terminal and the emitter terminal of the bipolar transistor 23 when compared with the case using a fixed amount of a base current. This configuration of the fourth embodiment enables that the voltage detector 40 precisely detects the voltage of each of the secondary battery units B1 to Bn. Further, it is possible that the base current is set to zero in order to complete the discharging at timing t33 when each of the secondary battery units B1 to Bn is nearly equal the desired voltage Va.

The voltage balancer device 400 of the fourth embodiment having the above configuration has the following effect (8).

(8) The voltage comparison unit 50 decreases the amount of the current flowing through the base terminal of the bipolar transistor 23 when the voltage detected by the voltage detector 40 is nearly equal the desired voltage Va. It is thereby possible to limit the amount of the current flowing through the discharge path 20 when the voltage detected by the voltage detector 40 reaches the desired voltage Va.

Fifth Embodiment

Hereinafter, a description will be given of the voltage balancer device 500 according to the fifth embodiment with reference to FIG. 10 and FIG. 11.

FIG. 10 is a view showing an entire configuration of the voltage balancer device 500 for the battery pack 10 according to the fifth embodiment of the present invention.

The voltage balancer device 500 of the fourth embodiment is basically equal to that of the first embodiment. The difference between the first embodiment and the fifth embodiment will be mainly described later. In the following explanation, the components of the voltage balancer device 500 of the fifth embodiment which are the same as those of the first embodiments are designated with the same numbers.

In the voltage balancer device 500 of the fifth embodiment shown in FIG. 10, the discharge path 20 is composed of the switching element 22 and a constant current diode 24 which are connected in series. Further, the discharge path 30 is composed of the switching element 32 and a constant current diode 34 which are connected in series.

In the configuration of the voltage balancer device 500 of the fifth embodiment, the constant current diodes 24 and 34 are so formed that the output current Ia of the constant current diode 24 is greater than the output current Ib of the constant current diode 34, and the voltage comparison unit 50 as the control means controls the on-off operation of the switching elements 22 and 32 in order to switch the discharge path.

Figure 11:
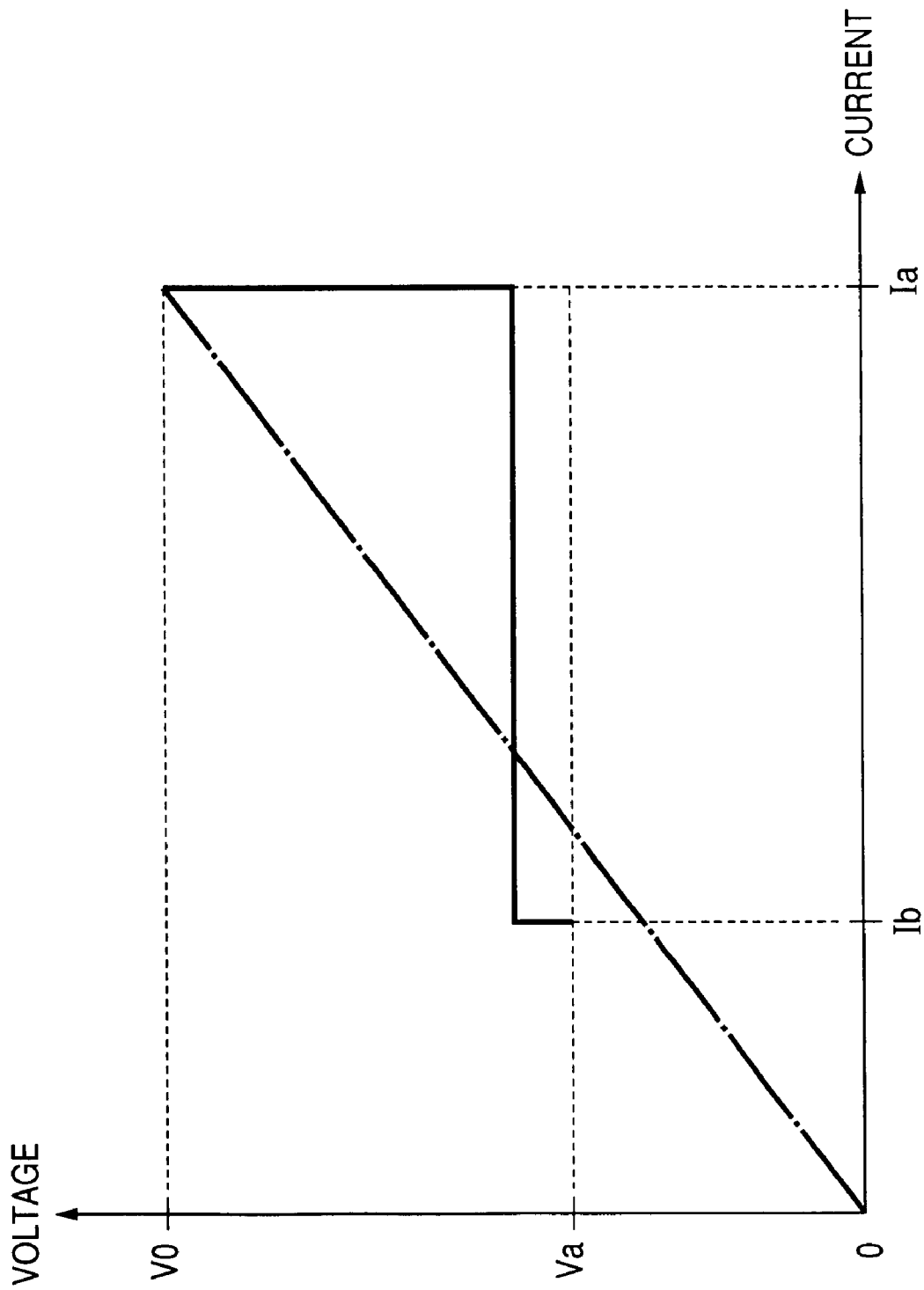
FIG. 11 is a view showing a relationship between a discharge current and a voltage in a voltage adjustment accuracy under the control of the voltage balancer device of the fifth embodiment.

FIG. 11 shows the discharging process performed by the switching elements 22 and 32 under the control of the voltage balancer device 500 according to the fifth embodiment. In FIG. 11, the vertical line indicates the voltage detected by the voltage detector 40 and the horizontal line indicates the discharge current.

As shown in FIG. 11, in case that the discharging is initiated when the voltage detected by the voltage detector 40 becomes the voltage V0, the voltage comparison unit 50 so controls that the switching element 22 is turned on and the switching element 32 is turned off. As a result, the discharging is performed only through the discharge path 20, and the discharge current is referred to as the output current Ia. Following, when the voltage detected by the voltage detector 40 becomes nearly equal the desired voltage Va, the voltage comparison unit 50 switches the state of both of the switching elements 22 and 32, namely, the voltage comparison unit 50 so controls that the switching element 22 is turned off and the switching element 32 is turned on. The discharging is thereby performed only through the discharge path 30 and the discharge current becomes the output current Ib that is smaller than the output current Ia. It is thereby possible to limit the discharge current when the voltage detected by the voltage detector 40 is near the desired voltage Va. In particular, it is possible to decrease the actual discharge current when the voltage detected by the voltage detector 40 is near the desired voltage Va when compared with the current that is determined by the desired voltage Va and the dashed line shown in FIG. 11 that connects the origin and the discharge start point (Ia, V0).

The voltage balancer device 500 according to the fifth embodiment of the above configuration has the following effect (9) in addition to the effect (3) of the voltage balancer device 100 of the first embodiment.

(9) The voltage balancer device 500 of the fifth embodiment has the discharge paths 20 and 30 composed of the switching elements 22 and 32 and the constant current diodes 24 and 34 connected in series. The voltage comparison unit 50 as the control means switches the currently-used discharge path to the other discharge path in order to select the discharge path to be newly used by controlling the switching elements 22 and 32. It is thereby possible to change the actual current flowing through the selected discharge path in order to limit the amount of the current when the voltage detected by the voltage detector 40 is nearly equal the desired voltage Va.

Sixth Embodiment

Hereinafter, a description will be given of the voltage balancer device 600 according to the sixth embodiment with reference to FIG. 12.

Figure 12:
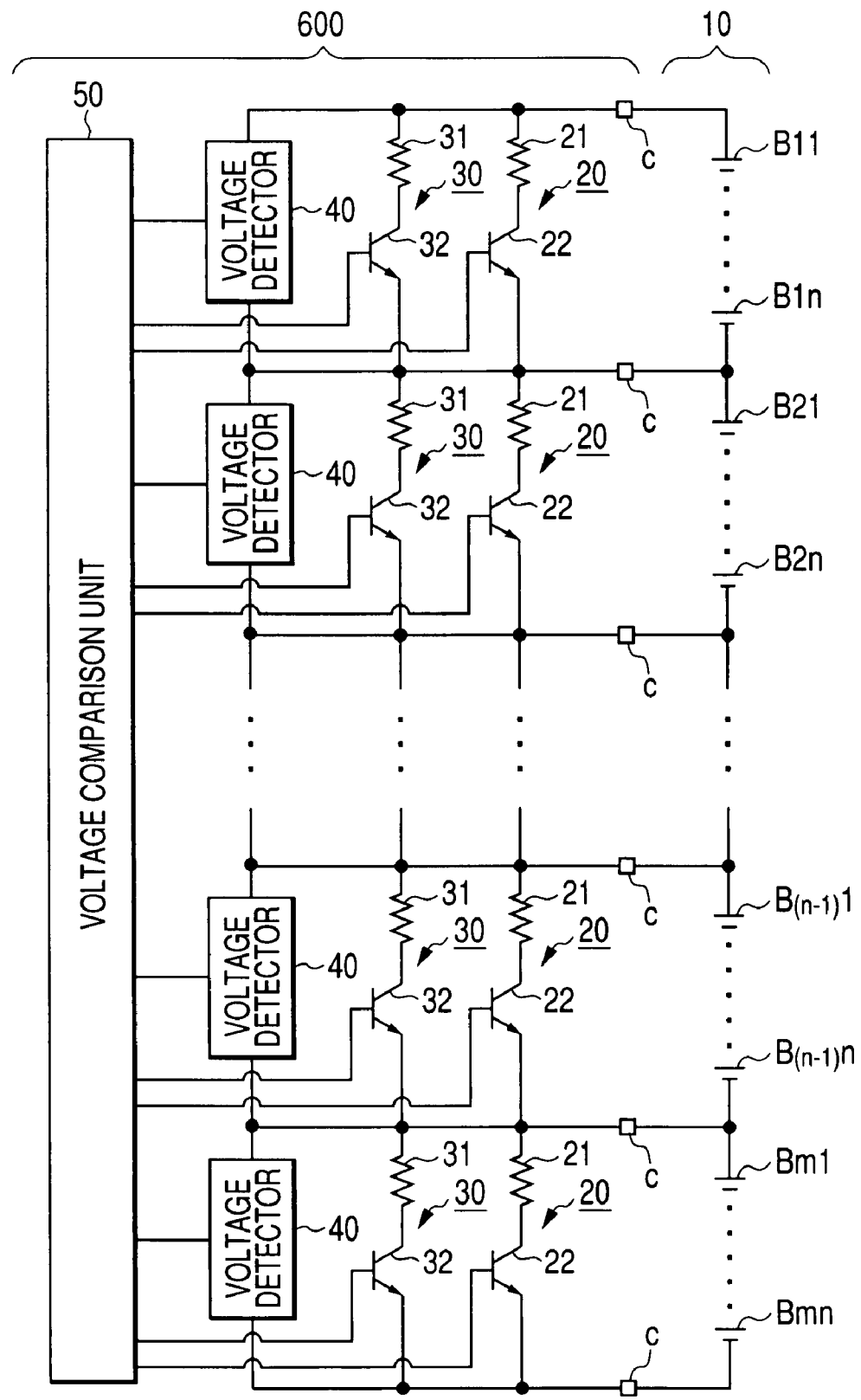
FIG. 12 is a view showing an entire configuration of a voltage balancer device for a battery pack according to a sixth embodiment of the present invention.

FIG. 12 is a view showing an entire configuration of the voltage balancer device 600 for the battery pack 10 according to the sixth embodiment of the present invention.

The voltage balancer device 600 of the sixth embodiment is basically equal to that of the first embodiment. The difference between the first embodiment and the sixth embodiment will be mainly described later. In the following explanation, the components of the voltage balancer device 600 of the sixth embodiment which are the same as those of the first embodiments are designated with the same numbers.

As shown in FIG. 12, each of the secondary battery units B1 to Bn is composed of a group of n battery cells Bi1 to Bin (i=1~m). For example, the secondary battery unit B1 is composed of plural battery cells B11 to B1n as a block. The discharge paths 20 and 30 are placed for each battery block. The voltage detector 40 detects the voltage of each battery block. The voltage comparison unit 50 controls the operation of the switching elements 20 and 30 based on the detected voltage in order to discharge the battery cells Bi1 to Bin (i=1~m) in the battery block of a higher voltage. The manner how to control both the discharge paths 20 and 30 in the sixth embodiment is equals to the manner in the first embodiment.

It is preferred to have the discharging function per secondary battery unit B1 to Bn like the first embodiment in addition to the discharging function capable of performing the discharging process per battery block.

According to the sixth embodiment of the present invention as described above, it is possible to have the effects for the secondary battery cells Bi1 to Bin in each battery block corresponding to the effects of the first embodiment.

(Other Modifications)

The first to sixth embodiments use a bipolar transistor as the switching element 22. The present invention is not limited by this configuration, for example, it is acceptable to use a MOS transistor as the switching element 22 instead of the bipolar transistor.

Further, each of the first to sixth embodiments uses the average voltage as the desired voltage Va between the secondary battery units B1 to Bn. The present invention is not limited by this configuration, for example, it is possible to use the minimum voltage between the secondary battery units B1 to Bn.

In the first embodiment, it is possible to use both the discharge paths 20 and 30 during the beginning period in the discharging, and to use one of the discharge paths 20 and 30 after the latter period of the discharging. In this case, it is possible to use the resistances 21 and 31 of a same resistance value.

Although the first and second embodiments use the discharge paths 20 and 30, the present invention is not limited by this configuration, for example, it is acceptable to use two or more kinds of discharge paths.

Further, although the first and second embodiments use the voltage comparison unit 50 as the control means that acts as the resistance change means capable of increasing the resistance value of the discharge path according to the decrease of the voltage of the secondary battery unit, the present invention is not limited by this configuration, for example, it is acceptable to have a single discharge path equipped with a variable resistance unit for each of the secondary battery units B1 to Bn placed in parallel, and to have a variable resistance means capable of adjusting the resistance value of the variable resistance means.

The third embodiment uses the voltage, corresponding to the residual capacitance, to be applied to the non-inverse input terminal of the operational amplifier 62. However, the present invention is not limited by this configuration. For example, it is sufficient to reduce the actual current value, at the desired voltage actually detected by the voltage detector, rather than the current value at the desired voltage that is determined by the alternate long and short dashed line shown in FIG. 7 which connects the origin of the voltage-discharge current line with the actual value at the beginning period of the discharging, where the voltage-discharge current line is detected by the voltage detector 40 by applying the voltage of more than zero to the non-inverse input terminal of the operational amplifier 62.

It is thereby possible to detect the voltage of each of the secondary battery units B1 to Bn with high accuracy because the amount of the current can be limited when the detected voltage reaches the desired voltage.

In the third embodiment, the voltage of a fixed level is applied to the non-inverse input terminal of the operational amplifier 62. However, the present invention is not limited by this configuration. For example, it is possible to apply a variable voltage to the non-inverse input terminal of the operational amplifier 62. In this case, it is preferred to apply an optional voltage to the non-inverse input terminal of the operational amplifier. This enables to adjust the voltage of each of the secondary battery units B1 to Bn to a desired voltage level with high accuracy without incorporating the voltage detector 40.

The third embodiment uses the switch 60 as shown in FIG. 6. However, the present invention is not limited by this configuration. For example, it is possible to perform the voltage discharging while avoiding that the voltage of each of the secondary battery units B1 to Bn does not exceed the reference voltage Vref without using the switch 60.

In the fifth embodiment, it is so controlled that the actual discharge current value when the detected voltage becomes the desired voltage Va is smaller than the current at the desired voltage Va that is determined by the alternate long and short dashed line shown in FIG. 7 which connects the origin (0, 0) to the discharge initial point (Ia, V0). However, the present invention is not limited by this configuration. For example, it is possible to limit the amount of the discharge current near the desired voltage Va without the above condition. It is possible to set the actual voltage to the desired voltage with high accuracy in short time by incorporating the plural discharge paths 20 and 30.

In addition, the fifth embodiment has the different output currents of the constant current diodes 24 and 34. However, the present invention is not limited by this configuration. For example, it is possible to have the same output current of the constant current diodes 24 and 34. In this case, it is also possible to limit the discharge current near the desired voltage by using both of the discharge paths 20 and 30 in the beginning period of the discharging and then using only one of the discharge paths 20 and 30 at the latter period of the discharging.

In the fifth embodiment, it is acceptable to use two or more discharge paths. Further, the constant current discharge means, that is capable of discharging a constant current regardless of the magnitude of the applied voltage, is made of a constant current diode. However, the present invention is not limited by this configuration. For example, it is acceptable to use a current mirror circuit and the like as the constant current discharge means instead of the constant current diode.

It is acceptable to mount the voltage balancer device for a battery pack or a battery module according to the present invention on another type of electric vehicles in addition to a hybrid electric vehicle (HEV).

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A voltage balancer device, for a battery pack composed of a plurality of secondary battery units connected in series, configured to discharge a voltage of the secondary battery unit to a desired voltage for voltage adjustment between the secondary battery units, comprising:

a first discharge path connected in parallel to and placed per secondary battery unit, the first discharge path having a first discharging device and a first switching element;

a second discharge path connected in parallel to and placed per secondary battery unit, the second discharge path having a second discharging device and a second switching element, the second discharging device being different than the first discharging device, a set of the first discharging device and the first switching element in the first discharge path and a set of the second discharging device and the second switching element in the second discharge path are connected in parallel with each other and further in parallel to the corresponding secondary battery unit; and a controller configured to limit a current flowing through the first or second discharge path so that an actual current flowing through the first or second discharge path at the desired voltage becomes lower than a theoretical current at the desired voltage of the first or second discharge path;

wherein the first discharge path and the second discharge path are connected in parallel with each other, and the first and second switching elements are operated by the controller so that discharge through the first discharge path is changed to discharge through the second discharge path and a current flowing through the second discharge path is smaller than a current flowing through the first discharge path during discharge to the desired voltage.

2. The voltage balancer device according to claim 1, wherein the controller has a variable resistance unit capable of increasing a resistance value of the discharge path through which the discharge current flows according to decreasing of the voltage of each secondary battery unit.

3. The voltage balancer device according to claim 2, wherein
the variable resistance unit selects the first or second discharge path to be used for the discharging according to the state of the first and second switching elements under the control of the controller.

4. The voltage balancer device according to claim 1, wherein each of the first and second discharge paths connects in parallel to corresponding secondary battery unit, the first and second switching elements are configured to switch electrical connection/non-connection of the first and second discharge paths, respectively, and each of the first and second discharge paths comprises:
a constant current discharger,
wherein the controller activates the first or second switching element in order to select the first or second discharge path connecting the activated switching element for discharging.

5. A voltage balancer device, for a battery pack composed of a plurality of secondary battery units connected in series, configured to discharge to a desired voltage a voltage of each secondary battery unit or a voltage of a group composed of several secondary battery units in order to adjust the voltage of each secondary battery unit, comprising at least first and second discharge paths, each discharge path being connected in parallel to and placed at each secondary battery unit, wherein
each discharge path comprises a switching element capable of switching an electrical on-off connection of the discharge path;
the first and second discharge paths are connected in parallel with each other;
the first discharge path has a first discharging device and the second discharge path has a second discharging device, the second discharging device being different than the first discharging device; and
the respective switching elements of the first and second discharge paths are operated so that discharge through the first discharge path and the second discharge path is changed to discharge through one of: (a) the first discharge path during a predetermined period and then the second discharge path discharge after the predetermined period to the desired voltage and (b) the second discharge path during a predetermined period and then the first discharge path discharge after the predetermined period to the desired voltage.

6. The voltage balancer device for a battery pack according to claim 5, wherein at least one of the first and second discharge paths further comprises a constant current discharger connected to the switching element of that discharge path in series.

7. The voltage balancer device for a battery pack according to claim 5, wherein the first and second resistances are respectively connected to the first and second switching element in series.

8. A voltage balancer device, for a battery pack composed of plurality of secondary battery units connected in series, configured to discharge to a desired voltage a voltage of each secondary battery unit or a voltage of a group composed of some secondary battery units in order to adjust the voltage of each secondary battery unit, comprising:
discharge paths, each discharge path being connected in parallel to and placed at the corresponding secondary battery unit; and
a controller configured to limit an actual current flowing through the discharge path when the voltage of the corresponding secondary battery unit becomes equal to a desired voltage by changing a discharge rate of the current flowing through the discharge path corresponding to the change of the voltage of the secondary battery unit;
wherein each of the plural discharge paths per secondary battery unit has a discharging device and a switching element capable of changing the discharge rate of the current flowing through that discharge path, and a set of the discharging device and the switching element in each discharge path is connected in parallel to the corresponding secondary battery unit, and the discharge paths per secondary battery unit are placed in parallel with each other, and
the controller switches the discharge paths of the corresponding secondary battery unit so that an entire current flowing through the discharge paths of the corresponding secondary battery unit is decreased more in a latter period of the discharge than in a beginning period of the discharge.

9. The voltage balancer device for a battery pack according to claim 8, wherein the controller comprises a variable resistance unit capable of increasing a resistance value according to decreasing the voltage of the secondary battery unit.

10. The voltage balancer device for a battery pack according to claim 9, and the variable resistance unit selects the discharge path to be used for discharging by controlling the switching element of that discharge path.

11. The voltage balancer device for a battery pack according to claim 8, wherein each of the plural discharge paths has a constant current discharger, and the controller selects the discharge path to be used for discharging by activating the switching element of that discharge path.

12. The voltage balancer device for a battery pack according to claim 1, further comprising an average value detector configured to detect an average value of the voltage of each secondary battery unit,
wherein the controller so controls that the secondary battery unit whose voltage is over than the average value is discharged through the discharge path corresponding to the secondary battery unit.

13. The voltage balancer device for a battery pack according to claim 5, further comprising an average value detector configured to detect an average value of the voltage of each secondary battery unit,
wherein the controller so controls that the secondary battery unit whose voltage is over than the average value is discharged through the discharge path corresponding to the secondary battery unit.

14. The voltage balancer device for a battery pack according to claim 8, further comprising an average value detector configured to detect an average value of the voltage of each secondary battery unit,
    wherein the controller so controls that the secondary battery unit whose voltage is over than the average value is discharged through the discharge path corresponding to the secondary battery unit.

15. The voltage balancer device according to claim 1, wherein the first discharging device is a first resistance and the second discharging device is a second resistance.

16. The voltage balancer device according to claim 5, wherein the first discharging device is a first resistance and the second discharging device is a second resistance.

17. The voltage balancer device according to claim 8, wherein the discharging device in the one of the discharge paths is a first resistance and the discharging device in the another one of the discharge paths is a second resistance.

18. The voltage balancer device according to claim 1, wherein the first discharging device is a first diode and the second discharging device is a second diode.

19. The voltage balancer device according to claim 5, wherein the first discharging device is a first diode and the second discharging device is a second diode.

20. The voltage balancer device according to claim 8, wherein the discharging device in the one of the discharge paths is a first diode and the discharging device in the another one of the discharge paths is a second diode.

21. A voltage balancer device, for a battery pack composed of a plurality of secondary battery units connected in series, configured to discharge to a desired voltage a voltage of each secondary battery unit or a voltage of a group composed of several secondary battery units in order to adjust the voltage of each secondary battery unit, comprising:
    a single discharge path equipped with a bipolar transistor capable of switching an electrical on-off connection of the discharge path and a resistance connected in series to the bipolar transistor, and the bipolar transistor and the resistance in the discharge path being connected in parallel to and placed per secondary battery unit; and
    a controller configured to limit a current flowing through the discharge path by decreasing a base current flowing through a base of the bipolar transistor so that the base current is decreased more in a latter period of the discharge than in a beginning period of the discharge, and the base current is more than zero.

22. The voltage balancer device according to claim 21, the beginning period of the discharge and the latter period of the discharge are within a discharge period of a detection voltage to a predetermined voltage.

23. The voltage balancer device according to claim 21, wherein a discharge current in the discharge path in the latter period of the discharge is more limited than in the beginning period of the discharge.

\* \* \* \* \*